United States Patent Office 3,202,440
Patented Aug. 24, 1965

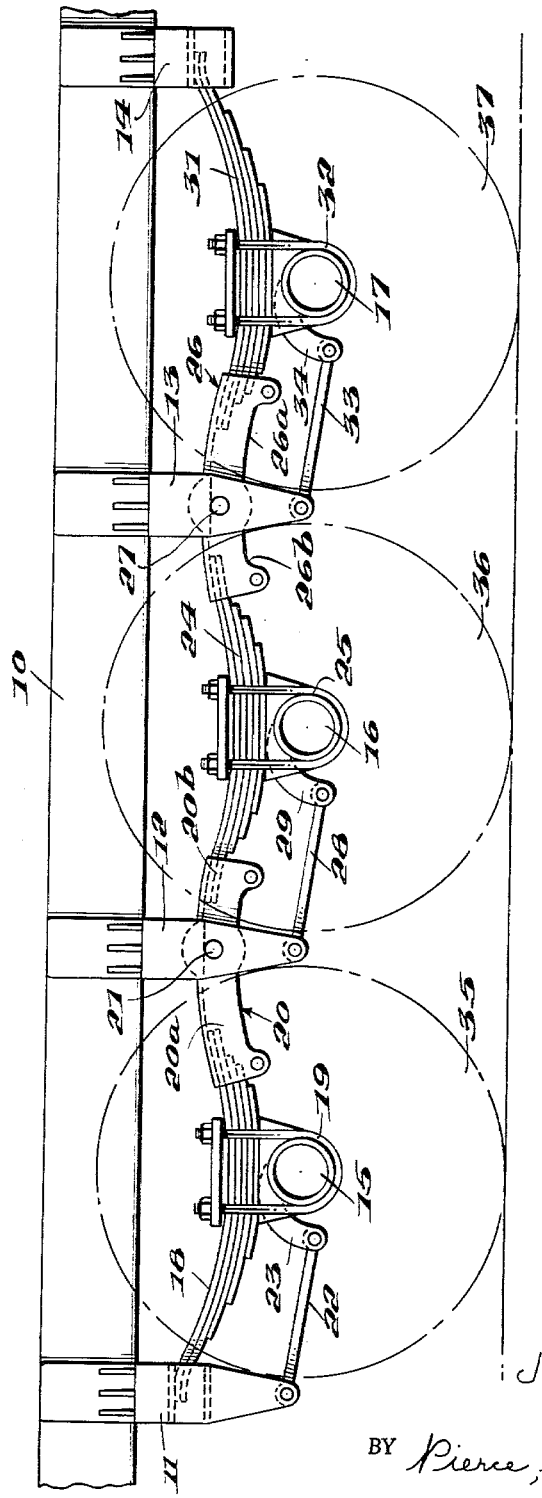

3,202,440
LOAD APPORTIONING TANDEM SUSPENSION STRUCTURE FOR VEHICLES
John N. Apgar, Sr., 644 Metape W., Bound Brook, N.J.
Filed Nov. 21, 1963, Ser. No. 325,244
3 Claims. (Cl. 280—104.5)

The present invention relates to tandem axle constructions and more particularly to an improved tandem structure which involves an assembly of three dead axles all of which are non-steerable and incapable of shifting laterally.

When tandem axle assemblies are utilized in particular as the so-called "rear" axle of a semi-trailer vehicle, wherein the multiple axle assembly is located at the rear of the trailer and the forward end of the trailer is connected by a fifth wheel to the conventional tractor unit the rear axle of which applies the driving power to the vehicle, it is obvious that much difficulty is encountered when negotiating a turn in the road. This is, of course, due to the fact that no one of the axles involved can function as the sole pivot axis about which the turn is to be made. Consequently, unless some special provision is made for alleviating this condition the turn is negotiated only with great difficulty involving severe stresses on the overall structure including the hangers, springs and wheels which can very well lead to wrecking and fatal road accidents. Even in the absence of a breakdown, especially when the axle assembly is heavily loaded, severe scuffing of the tires always occurs which not only reduces tire life but also increases the danger of blow-out by pulling the tire off the wheel as a result of the severe lateral stress imposed where the tire makes contact with the ground.

Various expedients have been suggested for solving this problem but all of them so far developed are either too complicated and/or too expensive. For example, it has been known to arrange one or more axles of the tri-axle assembly for lateral movement to facilitate negotiation of turns. It has also been suggested to make one or more of the axles steerable, but this also involves much complication as regards structure and is likewise considerably expensive.

The purpose of the present invention is to provide an improved construction for a tri-axle tandem which is comparatively simple in its construction, inexpensive to manufacture as related to its markedly improved operating characteristics and which is still quite rugged and reliable in operation and of long useful life. The improved tri-axle tandem provides a longer life for tires, a considerable reduction in structural and tire stresses and makes it possible to better negotiate tighter turns thus improving its maneuverability.

In accordance with the invention, the desired results are obtained by an asymmetrical division of the load in such manner as to impose a heavier portion of the total load on the middle one of the three axles of the tandem and lesser and preferably equal portions of the load on the leading and trailing axles. By making the middle axle carry more of the load, that axle tends to establish the pivot axis for turning and hence, makes it more easy for the leading and trailing axles to follow due to the substantial decrease in drag.

The foregoing as well as other objects and advantages inherent in the invention will become more apparent from the following detailed description of one suitable embodiment and from the accompanying drawing, the single figure of which is a view in side elevation of the improved tandem construction.

With reference now to the drawing, the chassis of the trailer unit includes side frame members or sills 10 extending longitudinally of the trailer. Only one of the sills and the corresponding side of the tri-axle suspension are shown in the drawing. However, the sill at the opposite side of the trailer chassis and the axle suspension are of identical construction. Four equally spaced hanger brackets 11 to 14 depend from the sills. The three dead axles of the tandem assembly are indicated at 15, 16 and 17 and each one of these axles is positioned between a pair of the brackets and secured thereto by a spring suspension. The spring suspension for the lead axle of the group, i.e. axle 15, includes a conventional multi-leaf type spring 18 which is secured fast at its middle portion to the axle 15 by means of a U-bolt 19. The front end of spring 18 is received within a recess in the front bracket 11, and the rear end of this spring is received within one arm 20a of rocker beam 20 which is pivotally mounted within bracket 12 by means of a pivot pin 21. A torque arm 22 extends between an arm 23 secured rigidly to axle 15 and a lower extended portion of bracket 11, and is connected at both ends to these members by means of articulated joints.

The spring suspension for the middle axle 16 includes a similar multi-leaf spring 24 secured fast at its middle portion to axle 16 by means of U-bolt 25. The front end spring 24 is received within the other shorter arm 20b of the rocker beam 20 and the rear end of spring 24 is received within one arm 26b of rocker beam 26 which is pivotally mounted within bracket 13 by means of pivot pin 27. A torque arm 28 extends between the lower end of bracket 12 and an arm 29 rigidly secured to axle 16, and the connections at the ends of the torque arm are of the articulated type.

The spring suspension for the rear axle 17 includes a multi-leaf spring 31 secured fast at its middle portion to axle 17 by means of a U-bolt 32. The front end of spring 31 is received within the other, longer arm 26a of rocker beam 26 and the rear end of spring 31 is received in a recess within the rearmost bracket 14. A torque arm 33 articulated at both ends, extends between the lower end of bracket 13 and an arm 34 rigidly secured to axle 17.

Pneumatically tired wheels 35, 36, and 37 are mounted on opposite ends of the axles 15, 16 and 17 and these have been shown by dashed lines only since their mounting is conventional and does not constitute any part of the inventive concept to which this application is directed.

As explained at the outset of the specification, all of the axles 15 to 17 are of the "dead" type and together with the wheels thereon always remain in essentially parallel relation and transverse to the direction of travel of the trailer. The axles can, of course, move up and down due to the spring suspension but there is no steering provided for the wheels or axles and also there is no lateral shifting of the axles. Consequently, the construction of the tri-axle tandem is relatively simple and inexpensive so far as tri-axle tandems are concerned.

As pointed out in the introduction, notwithstanding the fact that the axles cannot shift laterally and are not steerable, the axle assembly is still able to negotiate turns with a minimum amount of stress and tire distortion. This is attributable to the unique manner in which the load is divided between the three axles. Were the forwardly and rearwardly projecting lever arms 20a, 20b and 26a, 26b of the rocker beams 20 and 26 to have the same length, then the weight carried by the three axles would be divided equally between them. However, in accordance with the invention, these rocker beams have forward and rearward lever arms of unequal length and are so arranged that the middle axle 16 will carry more of the total load than either of the other two axles. In particular, it will be seen from the drawing that the lever arm, i.e. the effective length of arm 20a from the axis of pivot pin 21 is greater than that of arm 20b, and that the effective length of arm 26a with respect to the axis of pivot pin 27 is greater than that of arm 26b. While the ratio of the lengths of the rocker arms can be varied, dependent upon the proportion of the load which it is desired the middle axle shall carry, it has been found, for example, that for an eight foot spread, i.e. a distance of eight feet between the centers of the front and rear axles 15, 17 which for most states carries a maximum allowable load limit of 44,000 pounds, the ratio should be such as to develop, at the maximum load limit, a load of 18,000 pounds on the middle axle 16, and a load of 13,000 pounds on each of the front and rear axles 15, 17. With such a load division, the load on the middle axle can be kept within the maximum allowable single axle load limit imposed by most states which is usually in the neighborhood of 19,000 pounds.

By dividing the load asymmetrically as between the three axles so as to place a larger share of the load on the middle axle, that axle tends to assume the pivot axis when negotiating turns, so as to approach the advantages inherent in a single axle suspension wherein no difficulties arise in negotiating a turn. The asymmetric division of load in accordance with the invention whereby the middle axle is made to carry a larger share of the total load imposed upon the tri-axle tandem than each of the other two axles, thus makes it fairly easy for the tires on the front and rear axles to slip laterally on the roadway during a turn and thereby minimize the stresses imposed upon the tires as well as the roadway and the other components of the tandem including the springs and their hangers.

The relief of stress and strain on the component parts of the tri-axle tandem suspension for the rear end of a semi-trailer unit thus results in greater safety to the structural parts as well as in transit and also better maneuverability, which enables the driver to more safely make tighter turns with heavy loads. This added maneuverability is advantageous both while in transit on the highway between loading and unloading stations and also at the stations themselves which quite often require an abnormal amount of tight turning in relatively small areas to reach proper alignment with the loading platforms.

While, in accordance with the Patent Statutes, I have described and illustrated what I believe to be the best mode for carrying out the inventive concept, it is to be understood that various modifications can be made in the construction and arrangement of parts without, however, departing from the spirit and scope of the invention as defined in the appended claims.

I claim:
1. In a tri-axle tandem assembly for carrying the load at the rear end of a semi-trailer unit, the combination comprising four depending hanger brackets spaced longitudinally along each side of said semi-trailer unit, three dead non-steerable axles secured in parallel, spaced relation transverse to the longitudinal axis of said trailer unit and located between said hanger brackets, leaf springs individual to and secured intermediate the ends thereof to each of said axles, the front and rear hanger brackets serving to carry the front and rear ends of the front and rear springs respectively, and rocker beams pivotally mounted on the inner two brackets at each side of said semi-trailer unit, the two lever arms of said rocker beams extending towards each other and which carry corresponding ends of the leaf springs secured to the center axle being shorter than the other two lever arms of said rocker beams which carry the rear and front ends respectively of said front and rear springs, thereby to establish an asymmetrical division of the loading on said axles wherein the center axle carries more load than the lead and trail axles.

2. A tri-axle tandem assembly as defined in claim 1 wherein the shorter lever arms of said rocker beams have the same length.

3. A tri-axle tandem assembly as defined in claim 1 wherein the shorter lever arms of said rocker beams have the same length, and wherein the longer lever arms of said rocker beams also have the same length.

References Cited by the Examiner

UNITED STATES PATENTS 3,121,574   2/64   Hockensmith _____ 280—104.5

FOREIGN PATENTS 540,761   3/56   Italy.

BENJAMIN HERSH, *Primary Examiner.*
MILTON BUCHLER, *Examiner.*